United States Patent [19]

Stolki

[11] 4,036,927
[45] July 19, 1977

[54] PREPARATION OF MOLECULARLY ORIENTED CONTAINERS USING REHEAT PROCESS

[75] Inventor: Thomas J. Stolki, West Springfield, Mass.

[73] Assignee: Monsanto Company, St. Louis, Mo.

[21] Appl. No.: 566,256

[22] Filed: Apr. 9, 1975

[51] Int. Cl.$^2$ .......................................... B29C 17/07
[52] U.S. Cl. ...................................... 264/97; 264/25; 264/89; 264/98; 264/237; 264/348; 425/526
[58] Field of Search .................. 264/89, 90, 92, 94–99, 264/25–27, 234, 237, 345, 348; 425/DIG. 208; 432/9–11

[56] References Cited
U.S. PATENT DOCUMENTS

| | | | |
|---|---|---|---|
| 3,445,096 | 5/1969 | Seefluth | 263/3 |
| 3,715,109 | 2/1973 | Gilbert | 432/122 |
| 3,754,851 | 8/1973 | Reilly et al. | 264/98 X |
| 3,787,170 | 1/1974 | Gilbert | 432/122 X |
| 3,830,893 | 8/1974 | Steingiser | 264/25 |
| 3,894,835 | 7/1975 | Berggren et al. | 432/11 X |
| 3,963,399 | 6/1976 | Zavasnik | 425/242 B |
| 3,995,990 | 12/1976 | Dwyer et al. | 432/121 |

OTHER PUBLICATIONS

Derwent Publications, LTD., Belgium Patent No. 791,444 – 3/16/73, No. 29856U.

*Primary Examiner*—Jan H. Silbaugh
*Attorney, Agent, or Firm*—Eugene Zagarella

[57] ABSTRACT

Molecularly oriented containers are formed from molded preforms made of an amorphous thermoplastic resin and having a finished neck tubular portion and a body portion which method includes subjecting the preform body to a thermoforming orienting step while at a temperature at which substantial molecular orientation occurs, said temperature being arrived at by first overheating the outside of said preform body using external heating means to an average outside temperature greater than the substantial molecular orientation temperature range thereby creating a temperature gradient across the thickness of said preform body and then cooling said headed preform body until the average outside temperature is within said substantial molecular orientation temperature range and the entire preform body is at a temperature within said substantial molecular orientation temperature range and whereas said temperature gradient is significantly reduced.

15 Claims, 5 Drawing Figures

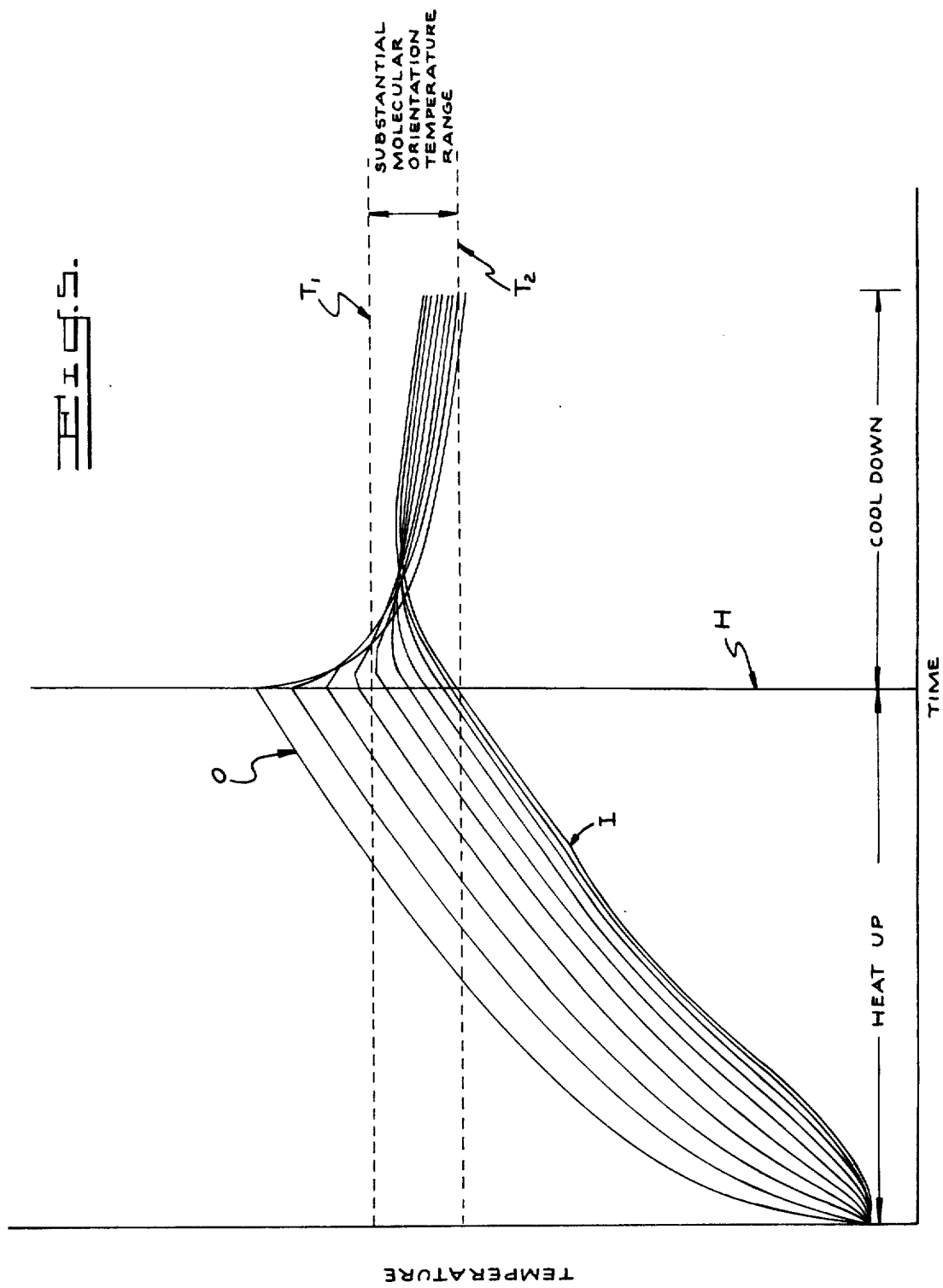

PREPARATION OF MOLECULARLY ORIENTED CONTAINERS USING REHEAT PROCESS

BACKGROUND OF THE INVENTION

This invention relates to an improved method for heating molded preforms to a temperature at which molecularly oriented containers can be produced by subjecting said heated preforms to a thermoforming orienting step.

It is known to molecularly orient thermoplastics in systems wherein such materials are being blow molded into hollow articles such as containers. Such molecular orientation is highly desirable, when the thermoplastic is of such a nature that orientation can be developed therein, since it can represent an attractive route toward improving the strength properties of the finished container. This feature is particularly important when the formed containers are to be used for packaging pressurized liquids such as carbonated beverages and beer as well as other products which require low permeability and high impact resistance as characteristics of the container.

A system is disclosed in Reilly et al, U.S. Pat. No. 3,754,851 for blowing articles from molded preforms which are brought to orientation temperature in an intermediate conditioning step. In this approach heat is removed from the preform during conditioning and such has become known in the art as a "cool-down" process. It is likewise known to add heat to preforms to bring them up to orientation temperature prior to finish forming as typically disclosed in Gilbert, U.S. Pat. No. 3,787,170 and such technique has become known in the art as a "reheat" process.

Although it has generally been considered less difficult to achieve orientation on a heating cycle (reheat process) than on a cooling cycle (cool-down process), the reheat process is by no means a simple procedure to carry out, particularly in a commercial operation. Some factors which affect the process are the preform thickness, thickness variations within a preform (particularly significant in extrusion blown preforms), heating time and the thermal conductivity of the preform material. Additionally complicating the matter are problems associated with forming containers from elongated tubular preforms having one end closed and made of thermoplastic material, It is extremely difficult to heat such preforms with any degree of uniformity because of the particularly low thermal conductivity of the materials and also because of the difficulty of applying heat to the inside of said preforms. Also, measuring the temperature of the preform both on its inside surface and through its thickness is quite difficult thereby hampering the ability to achieve the conditions necessary to obtain containers having the desired properties.

In order to overcome some of the problems noted above, a variety of processes and apparatus have been designed specifically for the reheat process. For example, Steingiser, U.S. Pat. No. 3,830,893 discloses a method for rapidly heating nitrile preforms to orientation temperature using microwave energy; Seefluth, U.S. Pat. No. 3,445,096 discloses a process and apparatus for heating tubular thermoplastic parisons to orientation temperature by alternately passing the parisons between a heating zone and a constant temperature zone maintained at a temperature just below the melting point of the parisons to distribute heat evenly throughout; and Gilbert, U.S. Pat. No. 3,715,109 who discloses apparatus for rapidly heating preforms to orientation temperature by applying heat to said preforms both externally and internally.

Despite the attention given to the problem of reheating workpieces to the desired orientation temperature as noted above, there still is the need for a simplified technique which will allow for the production of molecularly oriented containers using the reheat system and which is suitable for a continuous commercial operation.

SUMMARY OF THE INVENTION

Now, in accordance with this invention, there has been developed an improved and simplified method for efficiently reheating preforms to a molecular orientation temperature in preparation for the formation of multiaxially oriented containers.

Accordingly, a principal object of this invention is to provide an improved method for preparing molecularly oriented containers using the reheat system.

Another object is to heat preforms made of an amorphous thermoplastic resin to a temperature range at which substantial molecular orientation occurs using a two step reheating process.

Another object of this invention is to prepare oriented containers made of high nitrile polymers by subjecting preforms made of such materials to a thermoforming orienting step while at a molecular orientation temperature reached by first heating said preforms using external heating means to an average outside temperature above the substantial molecular orientation temperature range and cooling until the average outside temperature is within said range thereby reducing the temperature gradient across said preform thickness and bringing the entire preform temperature within said range.

Another object of this invention is to provide a simplified method for preparing oriented bottles on a continuous basis from high nitrile polymers by axially stretching and expanding preforms of such polymers at an orientation temperature reached by a two step reheating process.

Other objects of this invention will in part be obvious and will in part appear hereinafter.

These and other objects are accomplished by providing a method of forming a molecularly oriented container form a molded preform made of an amorphous thermoplastic resin and having a finished neck portion and a body portion, which method includes subjecting the preform body to a thermoforming orienting step while in a temperature range at which substantial molecular orientation occurs, said orientation temperature being arrived at by first overheating said preform body using external heating means to an average outside temperature greater than the substantial molecular orientation range thereby creating a temperature gradient across the thickness of said preform body and then cooling said heated preform body until the average outside temperature is within said substantial molecular orientation temperature range and the entire preform body temperature is within said substantial molecular orientation temperature range and wherein said temperature gradient is significantly reduced.

BRIEF DESCRIPTION OF THE DRAWINGS

In describing the overall invention, reference will be made to the accompanying drawings wherein:

FIG. 5 is a graph illustrating the results in terms of the time-temperature relationship of a typical run using the reheating procedure of this invention

DETAILED DESCRIPTION OF THIS INVENTION

Figure 1:
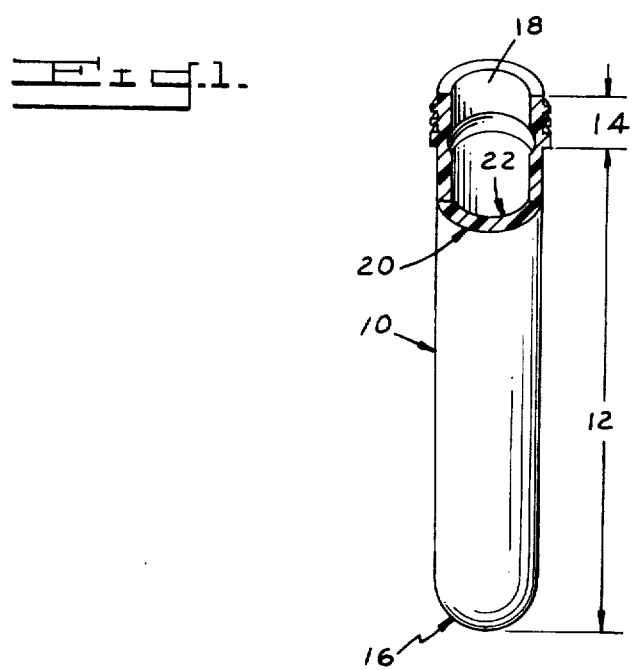
FIG. 1 is a perspective view with a portion broken away of a typical molded preform shape for use in the present invention.
Figure 4:
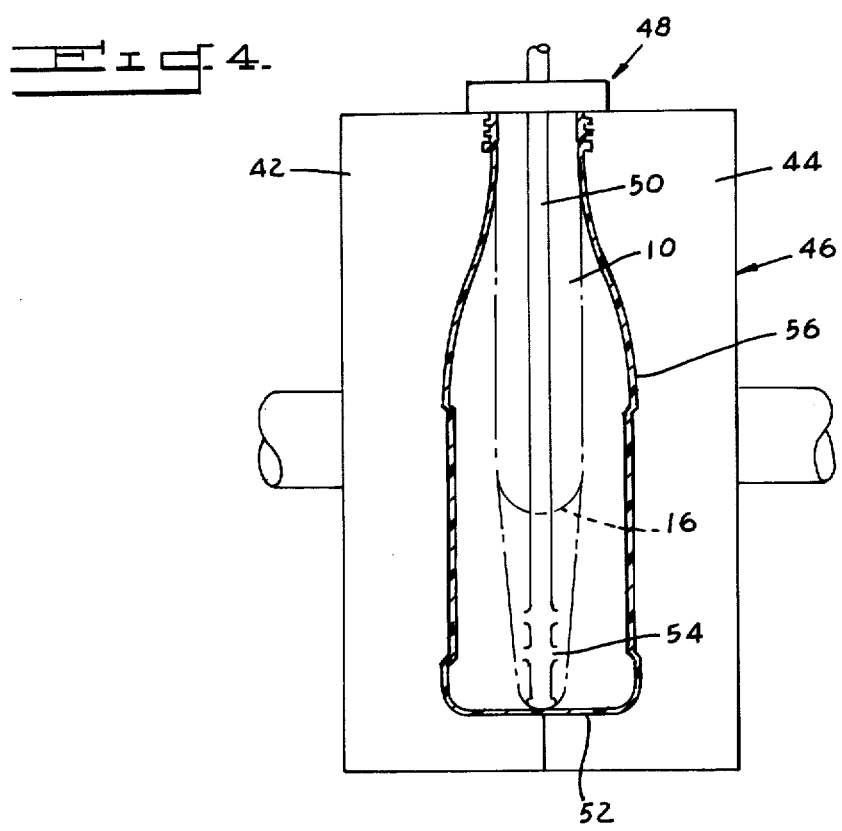
FIG. 4 is a schematic diagram illustrating the orienting and container forming steps of the invention.

In carrying out the method of this invention, an elongated tubular preform made of an amorphous thermoplastic material and having a general configuration of the type shown in FIG. 1 is molecularly oriented for example be axially stretching and radially expanding while at a temperature at which substantial molecular orientation occurs using a stretch blow mold station of the type illustrated in FIG. 4.

Generally speaking molecular orientation of an orientable thermoplastic preform may occur over a temperature range varying form just above the glass transition temperature (that temperature or narrow temperature range below which the polymer is in a glassy state) up to the melt temperature of the polymer. However, as a practical matter the formation of oriented containers is successfully carried out when the preform is at a much narrower temperature range defined as the substantial molecular orientation temperature range. This is best illustrated by reference to Table I which shows results obtained when preparing or attempting to prepare bottles over a wide temperature range. The birefringence stress values as noted in the results shown in Table I are used as an indication of the relative orientation properties of the prepared bottles. Such birefringence stress values were determined from the measurement of birefringence for the prepared bottles and using the technique and formulas for stress as defined by D. C. Drucker in "Photoelastic Separation of Principal Stresses by Oblique Incidence", Journal of Applied Mechanics, Sept. 1943, pp. A-156 to A-160. The stress-optical coefficient as used in this technique was determined using a curve of orientation release stress (ORS) vs birefringence for the material with ORS arrived at by the ASTM D 1504-70 method.

As Table I indicates, when the preform temperature is slightly above the glass transition temperature i.e. 232° F., bulbs rather than bottles were formed. When the preform temperature was increased to the 240° to 250° F. range, bottles were prepared having good orientation properties, expressed as birefringence stress, however, they were formed with low quality yields and other disadvantageous characteristics. This result was undoubtedly due to the difficulty to stretch and process the preforms in this temperature range. As the temperature is increased the processibility improves greatly and quality yields also improve, however, the orientation properties begin to fall off. It thus becomes necessary to balance the needs for processibility and quality with orientation results and this is called the temperature range at which substantial molecular orientation occurs. In other words the substantial molecular orientation temperature range as used throughout the specification and claims is defined as the temperature range at which preforms must be at to effectively and conveniently form oriented containers having suitable orientation properties such as by axially stretching and radially expanding said preforms. Thus, by forming oriented containers while in the substantial molecular orientation temperature range, process and quality problems related to the need for excessively high forces to stretch the preform at lower temperatures or the rapid relaxation of stresses on stretching at higher temperatures are avoided. More particularly, the temperature range at which substantial molecular orientation occurs for thermoplastic amorphous materials will vary form about 20° to about 60° F. and preferably from about 30° to about 55° F. above the glass transition temperature of said material.

TABLE I

Preparation of bottles by stretch/blowing a preform made of acrylonitrile/styrene (70/30 wt. ratio) having a glass transition temperature of about 230° F.

| Preform Temperature | Results |
| --- | --- |
| 212° F. | Stretch rod stopped on contact with preform |
| 232° F. | 8" bulbs formed - large areas of whitened polymer |
| 240–250° F. (outside/inside gradient) | Poor bottles formed having stretch lines and whitening Low quality yield Birefringence stress 494/326 psi |
| 250–270° F. | Quality yield approximately 50 percent Birefringence stress 450/280 psi |
| 260–275° F. | Few quality defects Birefringence stress 420/290 psi Convenient processability |
| 290–310° F. | Excellent processability Birefringence stress 200/160 psi |

The method of this invention involves the technique wherein amorphous thermoplastic preforms which have been formed eariler and have cooled down are reheated to the temperature at which substantial molecular orientation will occur. Reference to the graph of FIG. 5 will show how a typical operation will be carried out. The graph shows the computerized results of a heat transfer study made on a simulated run using selected preform material, size and shape and selected heating and cooling conditions. The graph shows temperature vs. time with O representing the outside surface and I the inside surface of a preform having the shape as shown in FIg. 1. As the preform is heated using external heating means, the outside surface will be at a higher temperature (O) than the inside surface (temperature I) and a temperature gradient across the thickness of the preform will result (note intermediate points between O and I). The temperature gradient results from heat being applied externally as well as the low thermal conductivity of thermoplastic materials. At the end of the heat up period, shown by vertical line H, the temperature gradient across the preform will be at its greatest but such gradient will be reduced and equalize itself somewhat during the ensuing cool down period. Lines $T_1$ and $T_2$ represent the temperature range within which substantial molecular orientation occurs. By heating the outside surface of the preform to a temperature above the substantial molecular orientation temperature range, a temperature gradient $T_o - T_I$ results. Upon cooling the preform until the outside temperature is within said substantial molecular orientation temperature range, the temperature gradient is significantly reduced. Also the overall preform or the entire preform body reaches a temperature equilibrium or distribution which is within this range for a significant period of time. During this extended period when the entire preform body is at a temperature within the substantial molecular orientation temperature range, molecularly oriented containers can desirably be formed using a stretch blow mold of the type illustrated in FIG. 4. The term overall or entire preform body as used throughout the specification and claims means all or essentially all of the body portion of the preform.

As noted in the simulated run of FIG. 5, during cool down the outside preform temperature drops below the inside preform temperature and remains that way for an extended period. Under certain conditions the outside temperature may remain higher than the inside and select conditions may even provide an equalization of temperature for an extended period. The important feature of this reheat method is that the entire preform body has a reasonably small temperature gradient or distribution and is within a temperature range which coincides with the substantial molecular orientation temperature range over an extended period of time.

FIG. 1 illustrates a typical elongated tubular preform 10 used to prepare containers such as bottles in accordance with the method of this invention. Preform 10 comprises a body portion 12 and a finish or neck portion 14 and has an open end 18 and a closed end 16. Outside surface 20 of said preform is directly exposed to the external heating means whereas inside surface 22 is not exposed directly to the external heating means and becomes heated through thermal conduction. Though the wall thickness and weight of the preform 10 may vary widely, it generally has relatively thick walls along body 12 typically ranging from about 120 to about 260 mils, and tyically weighing from about 15 to about 110 grams. The preform 10 may be formed by conventional means such as injection or blow molding and will generally comprise any amorphous thermoplastic material such as polystyrene, polyvinyl chloride and nitrile containing polymers. Particularly useful materials for preparing containers using the method of this invention are nitrile polymers containing from about 55% to about 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, glutaronitrile, methyleneglutaronitrile, fumaronitrile, etc., as well as mixtures of these monomers. The preferred monomers which are interpolymerized wih the nitrile monomers include aromatic monomers such as styrene and alpha methlstyrene; lower alpha olefins containing 2 to 6 carbon atoms such as ethylene, propylene, butylene, isobutylene, etc.; acrylic acid and methacrylic acid and the corresponding acrylate and methacrylate esters containing 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

Optionally, the high nitrile packaging materials may contain from 0 to about 25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubbery backbone, polyblend of a rubber graft polymer with a matrix polymer, etc.

The preferred nitrile polymers for those packaging applications requiring excellent oxygen and water vapor barrier properties in the packaging materials, are those nitrile polymers containing from about 55 to about 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from about 60 to about 83% by weight whereas with methacrylonitrile the preferred range is from about 70 to about 98% by weight of methacrylonitrile which corresponds to about 55 to about 78% by weight of nitrile monomer calculated as acrylonitrile. The preferred comonomers are styrene and alpha methyl styrene. Also preferred are interpolymers such as acrylonitrile/methacrylonitrile/styrene; acrylonitrile/styrene/methyl vinyl ether and acrylonitrile/styrene/ethyl vinyl ether.

Figure 2:
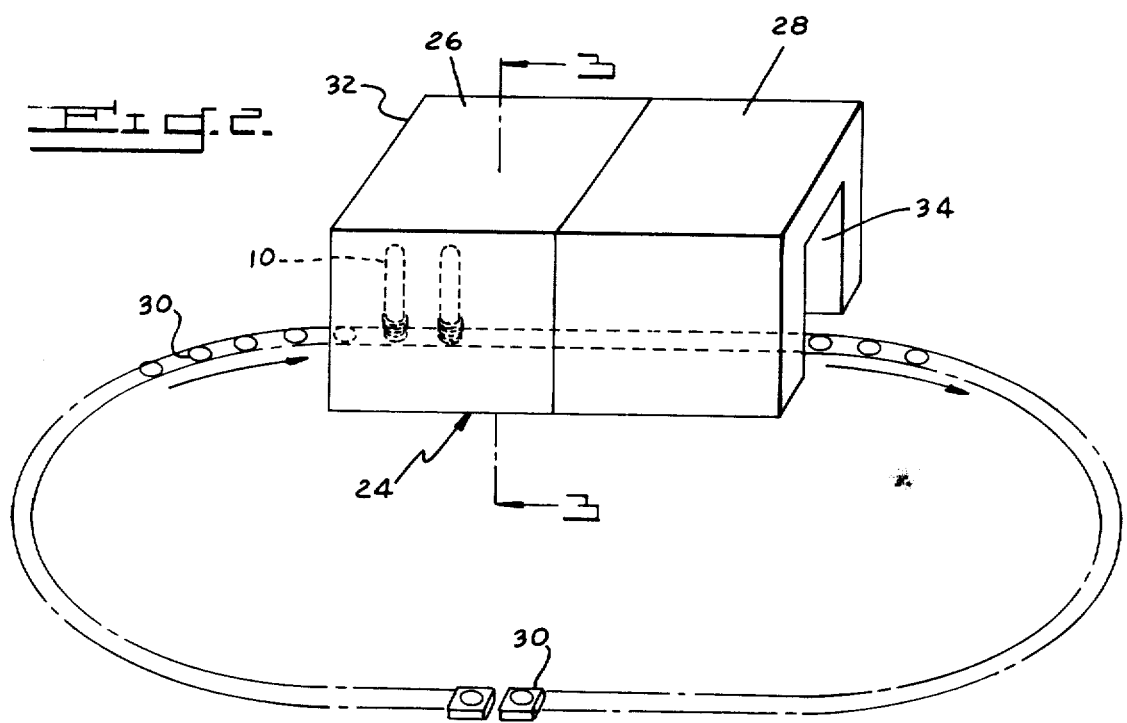
FIG. 2 is a schematic diagram illustrating the passage of preforms through heating apparatus useful in carrying out the method of this invention.
Figure 3:
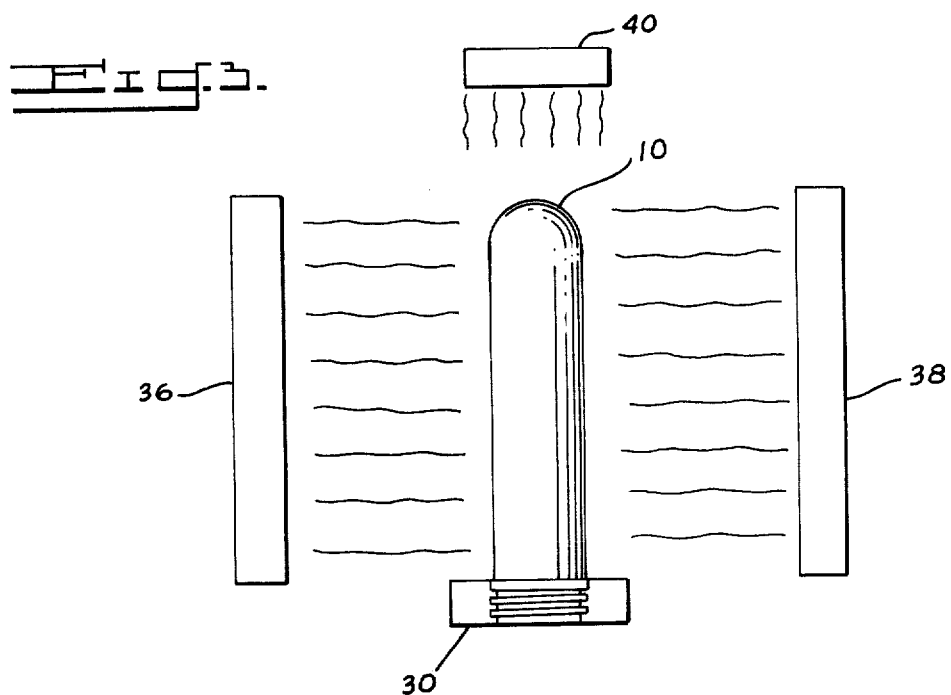
FIG. 3 is a schematic view showing one form of heating system useful in the method of this invention.

The heating of the cold preforms in accordance with the method of this invention may be carried out by passing said preforms through a heating oven containing conventional external heating means such as radiant heaters or forced hot air. Apparatus for carrying out the method is illustrated in FIG. 2 where preforms 10 are shown passing through oven or enclosed unit 24. The preforms 10 are manually or automatically placed neck down in holders 30 and conveyed in one or more passes through the oven 24 on an endless chain. In a manner not shown (except very generally in FIG. 3), the preform neck portion 14 (FIG. 1) is either placed within the holder or otherwise masked as it passes through the oven so that only the body portion 12 is exposed to the heating means. Neck portion 14 has been accurately finished and formed to close tolerances and is not intended to be further modified or altered at this time. The preforms 10 are conveyed through unit 24 entering at inlet side 32 and discharging through exit 34. The unit 24 as shown consists of two sections with 26 being the area where the heating takes place and 28 being the cool down area. To get more uniform heat distribution on the outside surface of the preforms, they may be rotated in a conventional manner such as by providing means to rotate the preform holders 30.

As the preforms 10 pass through the heating section 26, the outside surface is heated using external heating means until the average temperature is greater than the temperature range at which substantial molecular orientation occurs. Heat may be applied using banks of infrared heaters which surround the preform as illustrated by heaters 36, 38 and 40 in FIG. 3. As a practical upper limit, the outside preform temperature will not reach the point where sag, lean or distortion of the preform material will occur or where foaming will result due to the presence of small amounts of moisture. More particularly the outside surface of the preform is heated until it reaches a temperature of about 65° to about 100° F. greater than its glass transition temperature (Tg) and preferably from about 70 to about 90° F. greater than Tg. Since the preforms are heated externally and also because of the low thermal conductivity of the amorphous thermoplastic materials being used, the outside surface of the preform will be at an average temperature significantly greater than that of the inside surface, i.e. a temperature gradient will exist as shown at H in FIG. 5 as it leaves the heating section 26. The heater temperatures are not particularly critical and may be varied depending on such factors as the position within the unit, the speed at which the preforms are conveyed and the preform material. Temperature measuring means (not shown) may be provided to measure the outside preform temperature after it leaves the heating section and such information can be used to adjust and control the oven conditions so that the desired temperature can be reached.

The heated preform is then allowed to cool either in air or by passing through a second enclosure which may be joined with the heating section such as section 28 of FIG. 2. The temperature in this cool down section is significantly lower than the oven heating section and preforms are slowly passed therethrough until the outside average temperature drops to within the substantial molecular orientation temperature range. At the same time, as illustrated by FIG. 5, the temperature gradient across the preform thickness is being significantly reduced and the temperature or temperature distribution of the entire preform body tends to equalize or equilibrate within the substantial molecular orientation temperature range. In this operation, the outside average temperature of the preform is generally reduced to from about 20° to about 60° F. greater than Tg and preferably from about 30° to about 55° F. greater than Tg. The temperature in this cool down section can vary widely depending on conditions such as the speed at which the preforms are conveyed, the thickness of such preforms and the material thereof. Generally this temperature will be varied from room or ambient temperature up to the molecular orientation temperature.

Besides reducing the temperature gradient and allowing for more uniform temperatures throughout the preform thickness, this two step reheating procedure has another significant advantage. That is the ability to compensate for unintentional thickness variations resulting in the preform during processing, particularly in blow molded preforms. Thus, in the extended heat up process thinner spots will overheat, but conversely in the cool down process they will cool down faster thus allowing them to be lower in temperature as desired but still within the substantial molecular orientation temperature range when the overall operation is complete.

The heated and cooled down preform 10 is formed into an oriented container by enclosing it within partible sections 42 and 44 of blow mold 46, as shown for example in FIG. 4, while the temperature is within the substantial molecular orientation temperature range in order to complete the operation by carrying out a thermoforming orienting step. The term thermoforming as used in the specification and claims is intended to include all types of molding including blow molding as well as the axially stretching and radially expanding operation illustrated in the apparatus of FIG. 4. As shown in FIG. 4, a stretching mechanism 48 is moved into place over the end opening in the closed mold and rod member 50 is caused to move downwardly within and against base 16 each preform (shown in phantom in its initial position within the mold) to axially stretch the body portion of the preform against the lower wall 52 of the mold 46. Simultaneously therewith or immediately thereafter, an expanding medium issuing from orifices 54 in rod 50 is admitted into the interior of the preform to blow it outwardly against the cavity walls of the mold sections to form the container which, in the illustrated embodiment is a bottle 56.

The particular advantages of the method of this invention include the ability to obtain oriented containers from preforms using the reheat method in a simplified operation in high yield and quality and with improved uniformity in thickness.

Various modifications and alterations of the invention will be readily suggested to persons skilled in the art. For example, varying conditions in the heating and cool down procedures can be obtained as desired to allow for different materials and different thicknesses e.g. higher or lower heating and cooling temperatures and different rates of speed through either section. Additionally, temperature sensing and control means may be incorporated in the operation to aid in reaching and maintaining the desired conditions.

The following examples are given to illustrate more clearly the principles and practice of this invention and should not be construed as limitations thereof.

EXAMPLE I

A series of 35 grams blow molded preforms shaped as illustrated in FIG. 1 and made of a polymer comprising a 70/30 mixture by weight of polymerized acrylonitrile/styrene monomer and having wall thickness of about 150 mils ± 5 at an ambient temperature of about 75° F. were inserted in holders mounted on a conveyor and passed through a heating oven which contained two banks of infrared heaters on opposite sides, each bank being 35 inches long and consisting of eight horizontal heater strips varying in temperature from about 890° to about 1000° F. The ambient oven temperature as measured by a thermometer on top of the unit was 365° F. and the preforms were conveyed through said oven in a period of 2.5 minutes. The temperature of the preform was monitored at its outside surface (5inches from the base of the neck) using a Williamson infrared recording instrument as it left the oven with average temperature being in the 300° to 310° F. range. The preforms were then allowed to cool in air for about 2.5 minutes until the outside surface temperature of the preform was at 270° F. as recorded by the Williamson instrument. The preform was then immediately removed from its holder and enclosed within a blow mold in a manner illustrated in FIG. 4, axially stretched and expanded outwardly within the mold to form a container in the form of a bottle. Over two-thirds of the bottles formed had good material distribution and in no cases were holes or blow outs found.

EXAMPLE II

For the purposes of comparison, another series of preforms having the same configuration as those of Example I were passed through an oven having the same characteristics as in Example I except the heater strips were at a temperature of from about 770° F. to about 890° F. and ambient oven temperature was 335° F. The outside surface of the preforms were measured at temperatures averaging about 270° F. shortly after leaving the oven and were placed in a blow mold and stretched and expanded as described in Example I. Blow through holes were obtained in a significant number of preforms (>22%) and less than half of the preforms were blown into bottles having good material distribution.

WHAT IS CLAIMED IS:

1. In the method of forming a molecularly oriented container from a molded preform made of an amorphous thermoplastic resin and having an open end finished neck tubular portion and a closed end body portion which method includes subjecting the preform body to a thermoforming orienting step while in a temperature range at which substantial molecular orientation occurs, the improvement which comprises heating said preform body to said substantial molecular orientation temperature range by first overheating the outside surface of said preform body, by exposing only said outside surface to external heating means, to an average outside surface temperature greater than said substantial molecular orientation temperature range thereby creating a temperature gradient across the wall thickness of said preform body and then cooling said heated preform body until the average outside surface temperature is within said substantial molecular orientation temperature range and the entire preform body is at a temperature within said substantial molecular orientation temperature range and wherein said temperature gradient is significantly reduced.

2. The method of claim 1 wherein said thermoplastic resin is a nitrile polymer containing 55 to 85% by weight of nitrile monomer units based on the total polymer weight.

3. The method of claim 2 wherein the nitrile polymer is acrylonitrile.

4. The method of claim 3 wherein said acrylonitrile polymer contains a styrene comonomer.

5. The method of claim 4 wherein said preform is formed by blow molding.

6. The method of claim 4 wherein said preform is formed by injection molding.

7. The method of claim 1 wherein said preform is an amorphous thermoplastic preform and said heating and cooling is applied externally to the outside surface of said preform body.

8. The method of claim 7 wherein said preform is made of an acrylonitrile polymer containing 55 to 85% by weight of nitrile monomer units and a styrene comonomer.

9. In the method of forming a molecularly oriented container from a molded preform having an open end finished neck tubular portion and a closed end body portion and is made of an amorphous thermoplastic resin which has a glass transition temperature Tg, said method including axially stretching and radially expanding said preform body while in a temperature range at which substantial molecular orientation occurs, the improvement which comprises heating said molded preform body to said substantial molecular orientation temperature range by first overheating said preform body, by exposing only the outside surface thereof to external heating means, to an average outside surface temperature of from about 65° to about 100° F. greater than Tg thereby creating a temperature gradient across the thickness of said preform and then cooling said heated preform body until the average outside surface temperature is from about 20° to about 60° F. greater than Tg and the entire preform body is at a temperature within said substantial molecular orientation temperature range and wherein said temperature gradient is significantly reduced.

10. The method of claim 9 wherein said thermoplastic resin is a nitrile polymer containing 55 to 85% by weight of nitrile polymer units based on the total polymer weight.

11. The method of claim 10 wherein the nitrile polymer is acrylonitrile.

12. The method of claim 11 wherein said acrylonitrile polymer contains a styrene comonomer.

13. The method of claim 12 wherein said preform is formed by blow molding.

14. The method of claim 12 wherein said container is a bottle and wherein said preform body is overheated to an average outside surface temperature of from about 70° to about 909° F. greater than Tg and said heated preform body is cooled to an average outside surface temperature of from about 30° to about 55° F. greater than Tg.

15. The method of claim 12 wherein said preform is formed by injection molding.

* * * * *